UNITED STATES PATENT OFFICE.

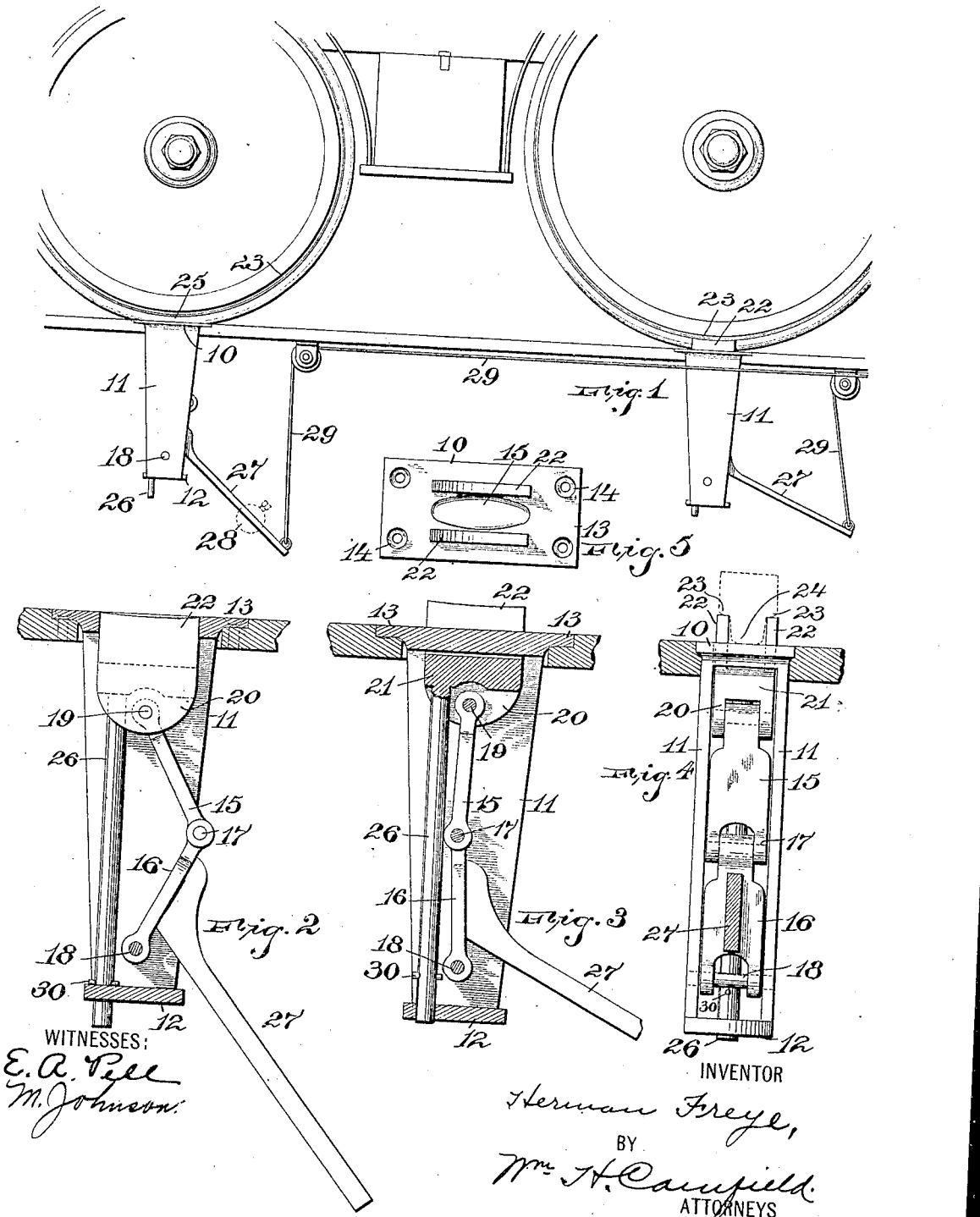

HERMAN FREYE, OF WEST ORANGE, NEW JERSEY.

SUPPORT FOR RUBBER-TIRE VEHICLES.

No. 926,479.

Specification of Letters Patent.

Patented June 29, 1909.

Application filed November 3, 1908. Serial No. 460,820.

*To all whom it may concern:*

Be it known that I, HERMAN FREYE, a citizen of the United States, residing at West Orange, in the county of Essex and State of New Jersey, have invented certain new and useful Improvements in Supporters for Rubber-Tire Vehicles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a device for supporting rubber tired vehicles, by the edges of the rim adjacent to the rubber, so that when the vehicle rests on the tires for a long time, in one place, there is no flattening effect on the material of which the tire is composed, and in this way the life of the tire is lengthened and the vehicle remains an easy riding vehicle.

This device is applicable to all rubber tired vehicles, whether of the solid rubber type or inflated, but is particularly designed for the solid rubber tired wheels.

In heavy apparatus, such as fire apparatus, and especially in small places or the outlying districts of large cities, the vehicles are not used very much and are apt to stay in quarters a long time and rest on the same spot on the wheels. This flattens the tires at the point on which they are resting, and after a while they become uneven.

The object of this device is to lift the wheel by mechanism within a casing underneath the floor, this lifting being done on the rigid edges of the felly adjacent to the tire, and lift the wheel either clear of the floor, or high enough to take the weight from the rubber of the tire.

Supporters for wheels have been made for fire-houses, and similar places, that are permanently fixed in the floor and project therefrom. These have a disadvantage in that the supporters for the front wheels are apt to cut the tires of the rear wheels when the rear wheels pass over them.

The device herein described operates as a jack to lift the wheel, there being preferably four of these used on a vehicle, that is, one for each wheel, and when so raised, the weight of the vehicle holds the supporter in place. As soon as the vehicle that is supported leaves the supporter, the supporting plates or strips fall within the casing so that there is a flush surface on the floor, and no obstructions are present when the rear wheels pass over the space on which the front wheels rested. The devices are adapted to be operated simultaneously when lifting the vehicle, but a simpler method is to raise each one separately, and thus not raise the whole weight at the same time, and in this way one operator can lift a wagon or truck easily.

The invention is illustrated in the accompanying drawing, in which—

Figure 1 is a side view of a pair of supporters arranged on the front and rear wheels of a vehicle, one being shown depressed or withdrawn so as not to support the wheel, and the other supporter being shown elevated to lift the wheel slightly from the floor. Fig. 2 is a section of the device with the lifting mechanism and the supporting plates in elevation. Fig. 3 is a similar section, but with the supporting plates shown in section. Fig. 4 is an end view with the operating lever shown in section, and Fig. 5 is a top view of Fig. 3.

The device comprises a casing which has a top plate 10 and depending side plates 11 and a bottom 12. The top plate 10 has flanges 13 which rest in the floor and act to support the device, and the flanges are supplied with the perforations 14 to receive suitable screws by which the device is held in place. The top plate is also provided with an approximately centrally arranged depression 15 in which the wheels are adapted to ride so that the vehicle can be properly placed before it is raised, and insuring the disposition of the supporting plates of the supporter underneath the wheel perpendicular to the axle.

In the casing of the device are arranged the levers 15 and 16 which form a toggle, they being pivoted together on the pin 17 and the toggle 16 swinging on a pin 18 secured to the casing and forming the element against which the pressure of the toggle is exerted on one end. The other end of the toggle is secured to a pin 19 arranged in the plates 20 of the block 21. The block 21 has, projecting therefrom, the supporting plates 22 which are adapted to pass up through the top plate 10 and engage the metal parts 23 of a vehicle wheel, as shown in Figs. 1 and 4, and thus save the tire portion 24 from flattening by raising it sufficiently to take the weight of the vehicle off of it, and doing away with the flat part 25 of the wheel, as shown on the left of Fig. 1. The toggle is adapted to swing on both sides of the center, that is, on both sides of the point where the levers are alined, and to limit the movement of this toggle in one direction, I install a rod 26 which depends from the block 21 and passes through the bottom 12. The toggle, by resting against this rod, is limited in its movement and the weight of the wheel and the supporting plates 22 securely hold the toggle against the rod 26, and in this way the wheel is supported. A bar 27 projects from the lower toggle lever 16 and may be provided with a suitable weight 28 if necessary.

In this specification the terms make and break the toggle are understood to mean respectively putting the toggles in alinement to support a weight, and to put them out of alinement so as to allow the supporting means to descend.

This bar is used as a lever to make the toggles when a wheel over the supporter is to be raised. The major portion of the travel of the supporting plates and the toggle is easy, because the supporting plates have a distance to travel, vertically, before they engage the portions of the rim to be engaged by them, and when they do engage the rim they are nearly alined and it takes but little pressure on the end of the bar 27 to force the toggles into place. The weight of the vehicle being very much greater than the weight of the bar 27, the toggle is kept in the position shown in Fig. 3, and the rim of the wheel is kept clear of the floor. When however the vehicle is moved forward or backward so as to clear the supporting plates 22, the weight of the bar 27 then operates to pull down the toggle lever 16 as shown in Fig. 2, and this results in breaking the toggle and the supporting plates and their block thereby being withdrawn into the casing. In case of an apparatus moving forward, this removes all obstructions on the floor and there is no danger of cutting the rear tires, and also removes any obstructions that might be calculated to trip the party passing across the floor, and are thought to furnish a simple operating means for relieving the pressure on tires when a vehicle is at a standstill.

When desired, a strand 29 can be placed over suitable pulleys so that all the bars 27 can be operated either simultaneously or individually from the floor on which the apparatus or vehicle stands, or the device can be arranged to project into a cellar and the bars 27 operated by hand from the cellar. Suitable projections or a pin 30 can be used to limit the movement of the rod 26 through the casing, as will be seen from Fig. 2, thus acting to limit the movement of the toggles when they are broken.

Having thus described my invention, what I claim is:—

1. A supporter for wheels comprising a casing, a toggle having supporting means on its upper end, and means for making the toggle, the toggle when made being adapted to be held in position by the weight supported, said means being adapted to automatically break the toggle when the supported weight is removed.

2. A supporter for wheels comprising a casing, supporting means projecting from the casing and adapted to be held in projected position by the weight supported, plates on the supporting means for engaging the wheel on both sides of its tire and means for operating the supporting means to lift the weight supported and cause the automatic withdrawal of the supporting means when the supported weight is removed.

3. A supporter for wheels comprising a casing, a toggle supported therein, parallel supporting plates on the toggle, for engaging a wheel on both sides of its tire, means for limiting the movement of the toggle in one direction when it is slightly out of alinement, and manually operated means for making the toggle and normally acting to break the toggle.

4. A supporter for wheels comprising a casing, a toggle supported on one end in the casing, a sliding wheel support on the toggle, means on the support for engaging the bottom of a wheel on both sides of its tire, a lever on the toggle acting by its weight to break the toggle and also acting as a manually operated means for making the toggle, and a stop for the toggle when it is made.

5. A supporter for wheels comprising a casing, a toggle supported on one end in the casing, a supporting means on the toggle, a lever on the toggle acting to normally break it, a rod on the wheel support and acting to limit the movement of the toggle when made, and means on the rod for limiting its movement when the toggle is broken.

6. A wheel supporter comprising a casing, a toggle supported on one end in the casing, supporting plates sliding in the casing and secured to the free end of the toggle, a rod sliding in the casing and attached to the wheel support, means on the rod for limiting its movement in one direction, the rod acting as a stop to limit the movement of the toggle in the other direction, and a lever on the toggle normally acting to break the toggle and also serving as a manually operated means for making the toggle.

7. A wheel supporter comprising a casing adapted to have its top surface flush with the floor, a toggle supported in the casing, a block on the free end of the toggle, supporting plates on the block and adapted to slide through the top of the casing, the casing having a slight depression between the supporting plates, a rod on the block and having its free end in sliding engagement with the casing, means on the rod for limiting its movement in the casing, the rod being adapted to be engaged by the toggle when the toggle is made, and a lever projecting from the toggle forming manually operated means for making the toggle and normally acting by its own weight to break the toggle.

In testimony that I claim the foregoing, I have hereunto set my hand this 2nd day of November 1908.

HERMAN FREYE.

Witnesses:
E. A. PELL,
WM. H. CAMFIELD.